3,507,875
BASICALLY SUBSTITUTED BENZOIC ACID AMIDES
Ernst Jucker, Ettingen, and John Gmünder, Muttenz, Switzerland, assignors to Sandoz Ltd. (also known as Sandoz A.G.), Basel, Switzerland
No Drawing. Filed Jan. 17, 1966, Ser. No. 520,856
Claims priority, application Switzerland, Jan. 19, 1965, 734/65; Apr. 6, 1965, 4,769/65; Aug. 25, 1965, 11,953/65
Int. Cl. C07d *29/34, 29/26, 29/14*
U.S. Cl. 260—293.4      14 Claims

ABSTRACT OF THE DISCLOSURE

Substituted benzoic acid amides having the general formula:

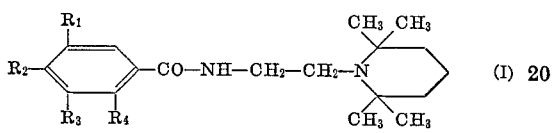

in which (a) one of the substituents $R_1$, $R_2$ and $R_3$ is hydrogen, the second is hydrogen, fluorine, chlorine, bromine or methyl, the third is hydrogen, sulphamoyl or nitro, or
(b) one of the substituents $R_1$, $R_2$ and $R_3$ is hydrogen and the remaining two are chlorine, or
(c) each of $R_1$, $R_2$ and $R_3$ is methoxy, and $R_4$ is hydrogen or, when $R_1$ is sulphamoyl, $R_2$ is chlorine and $R_3$ is hydrogen, $R_4$ is chlorine, and physiologically acceptable acid addition salts thereof having hypotensive activity are provided.

---

The present invention relates to new basically substituted benzamides and a process for their production.

The present invention provides basically substituted benzamides of Formula I,

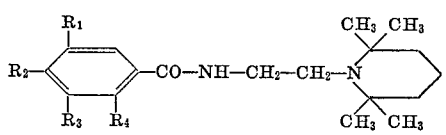

in which (a) one of the symbols $R_1$, $R_2$ and $R_3$ signifies a hydrogen atom, a second symbol signifies a hydrogen, fluorine, chlorine or bromine atom or a methyl radical, and the third symbol signifies a hydrogen atom or a sulphamoyl or nitro radical, or
(b) one of the symbols $R_1$, $R_2$ and $R_3$ signifies a hydrogen atom and the remaining two symbols signify chlorine atoms, or
(c) each of the symbols $R_1$, $R_2$ and $R_3$ signifies a methoxy radical, and $R_4$ signifies a hydrogen atom or— when $R_1$ signifies sulphamoyl, $R_2$ signifies chlorine and $R_3$ signifies a hydrogen atom—a chlorine atom, and their acid addition salts.

The present invention further provides a process for the production of compounds I and their acid addition salts, characterized in that an ethylenediamine derivative of Formula II,

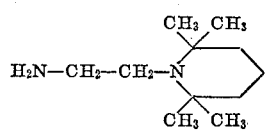

is acylated with a benzoyl halide of Formula III,

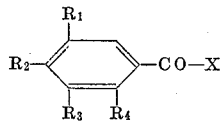

in which $R_1$, $R_2$, $R_3$ and $R_4$ have the above significance, and X signifies a chlorine or bromine atom, optionally in the presence of an acid binding agent, when the free base is desired, this is liberated from the resulting salt, and, when an acid addition salt is desired, the base is solidified.

The starting material of Formula II is the known 2-(2,2,6,6-tetramethylpiperidino)-ethylamine; suitable benzoyl halides of Formula III are, for example, benzoyl chloride, 3,4-dichlorobenzoyl chloride, 4-chloro-3-sulphamoyl-benzoyl chloride and 2,4-dichloro-5-sulphamoyl-benzoyl chloride.

One method of effecting the process of the invention is as follows:

A solution of a benzoyl halide, preferably a benzoyl chloride, of Formula III in an inert organic solvent, e.g. methylene chloride, carbon tetrachloride, acetone, benzene or toluene, preferably chloroform, is added dropwise at 0–20° C. whilst stirring to a solution of an ethylenediamine of Formula II in the same solvent. The difficultly soluble benzoyl halides, e.g. 4-chloro-3-sulphamoyl-benzoyl chloride, are added pulverized and portionwise or are suspended in one of the above solvents, whereupon a solution of the ethylenediamine II in the same solvent is added dropwise.

It is often advantageous to add an acid binding agent, e.g. a tertiary organic base, preferably triethylamine; this is, however, usually not absolutely necessary as the ethylenediamine of Formula II used for the reaction contains a tertiary amino radical aside from the primary amino radical to be acylated; this tertiary amino radical is capable of binding the hydro-hlide liberated during the reaction.

In order to complete the reaction the mixture is further stirred for several hours, e.g. for 18 to 48 hours, and is then optionally heated at reflux for one hour, whereupon the resulting final products may be isolated and purified as bases or in the form of their salts in manner known per se.

The compounds of Formula I may be liberated from the salts obtained in accordance with above process in the usual manner, e.g. by treating with dilute ammonia, an aqueous alkali or an anion exchange resin which has been activated with an alkali. The free bases may be converted with inorganic or organic acids into the corresponding salts, the production of which also forms part of the present invention. Examples of acids for acid addition salt formation are: hydrochloric, hydrobromic, sulphuric, fumaric, malonic, tartaric, methane-sulphonic or p-toluene-sulphonic acid.

The hitherto unknown, basically substituted benzamides produced in accordance with the present invention, especially N-[2-(2,2,6,6-tetramethylpiperidino)-ethyl]-4-chloro-3-sulphamoyl-benzamide, as well as the corresponding 3,4-dichloro- and 2,4-dichloro-5-sulphamoyl-benzamides, are characterized by valuable pharmacodynamic properties. Thus, they have a pronounced antihypertensive effect which sets in slowly and lasts for several hours; this effect also results when the compounds are administered perorally. The toxicity of the compounds is very low, the $LD_{50}$ being more than 1 g./kg. body weight of the test animals when administered orally. The compounds are thus indicated for use in the treatment of hypertonia, in which case they are preferably administered in the form of their water-soluble, physiologically tolerated salts. A suitable average daily dose of compounds I is 20 to 500 mg.

The compounds may be used as pharmaceuticals on their own or in the form of suitable medicinal preparations for administration, e.g. enterally or parenterally. In order to produce suitable medicinal preparations the compounds are worked up with organic or inorganic adjuvants which are physiologically inert. Examples of such adjuvants are—for tablets and dragées: lactose, starch, talc and stearic acid; for injectable solutions: water, alcohols, glycerin and vegetable oils. The preparations may furthermore contain suitable preserving, stabilizing and wetting agents, solubilizers, sweetening and colouring substances and flavourings.

Some of the benzoyl halides of Formula III used as starting materials are known; those which are unknown may be obtained from the correspondingly substituted benzoic acid by the usual reaction with a suitable halogenating agent, e.g. thionyl chloride, phosphorus pentachloride or phosphorus tribromide.

Some of these benzoic acids, however, have hitherto not been described in the literature; they may be produced from known compounds, for example, as follows: 3-fluoro - 5 - nitro-, 3 - fluoro - 4 - sulphamoyl-, 3 - bromo- and 3-fluoro-5-sulphamoyl benzoic acid are obtained by oxidation, e.g. with chromium trioxide in glacial acetic acid or potassium permanganate in alkaline solution, of the correspondingly disubstituted toluenes which are known with the exception of the two fluoro-sulphamoyl derivatives.

These fluoro-sulphamoyl derivatives may be obtained from 3 - fluoro - p - toluidine or from 3 - fluoro - m-toluidine (produced by reduction of 3-fluoro-5-nitrotoluene) as follows: Diazotization is effected, the diazonium salt is reacted with sulphur dioxide and copper-(I)-chloride and the resulting chlorosulphonyl derivative is converted into the desired sulphamide with ammonia.

3 - methyl - 5 - sulphamoyl - benzoic acid is produced in that the corresponding methyl-sulpho-benzoic acid is reacted with phosphorus pentachloride, the resulting dichloride is hydrolyzed to give 3 - methyl - 5 - chloro - sulphonyl-benzoic acid and this is treated with ammonia.

The term "in manner known per se" as utilized herein designates methods in use or described in the literature on the subject.

In the following non-limitative examples all temperatures are indicated in degrees centigrade. The melting and boiling points are uncorrected.

EXAMPLE 1

N-[2-(2,2,6,6-tetramethyl-piperidino)-ethyl]-4-chloro-3-sulphamoyl-benzamide 12.7 g. of 4-chloro-3-sulphamoyl-benzoyl chlorine are added portionwise whilst stirring and cooling with ice to a solution of 9.2 g. of 2-(2,2,6,6-tetramethyl-piperidino)-ethylamine in 120 ml. of chloroform and the reaction mixture is subsequently stirred at room temperature for a further 48 hours. The precipitated hydrochloride of the compound mentioned in the heading is filtered off and recrystallized from ethanol/water (1:1); melting point 293–295°.

Hydrogen malonate: The hydrochloride obtained above is dissolved in a hot mixture of ethanol/water (1:1) and an equivalent of aqueous sodium hydroxide solution is added to the solution. The base which is difficultly soluble in water is filtered off and taken up in a hot aqueous solution of the calculated amount of malonic acid, whereby a clear solution results. The pure hydrogen malonate, having a melting point of 173° (decomposition), crystallizes upon cooling.

EXAMPLE 2

N-[2-(2,2,6,6-tetramethyl-piperidino)-ethyl]-3,4-dichloro-benzamide

A solution of 5.2 g. of 3,4-dichloro-benzoyl chloride in 20 ml. of chloroform is added whilst stirring and cooling to a solution of 4.6 g. of 2-(2,2,6,6-tetramethyl-piperidino)-ethylamine in 60 ml. of chloroform. After one hour the mixture is allowed to warm to room temperature and after a further 48 hours the clear reaction solution is evaporated to dryness at reduced pressure. The resulting hydrochloride of the compound mentioned in the heading is recrystallized from ethanol for purposes of purification; melting point 245–247°.

The following compounds are produced in a manner analogous to that described in Example 1:

EXAMPLE 3

N-[2-(2,2,6,6-tetramethyl-piperidino)-ethyl]-4-sulphamoyl-benzamide

Melting point of the hydrochloride 295–297°, after crystallization from methanol/water (2:1).

EXAMPLE 4

N-[2-(2,2,6,6-tetramethyl-piperidino)-ethyl]-4-fluoro-3-sulphamoyl-benzamide

Melting point of the hydrochloride 273–275°, after crystallization from water/ethanol (7:3).

EXAMPLE 5

N-[2-(2,2,6,6-tetramethyl-piperidino)-ethyl]-4-methyl-3-sulphamoyl-benzamide

Melting point of the hydrochloride 290–292°, after crystallization from ethanol/water (1:1).

EXAMPLE 6

N-[2-(2,2,6,6-tetramethyl-piperidino)-ethyl]-4-bromo-3-sulphamoyl-benzamide

Melting point of the hydrochloride 297–298°, after crystallization from water/isopropanol (2:1).

EXAMPLE 7

N-[2-(2,2,6,6-tetramethyl-piperidino)-ethyl]-3-sulphamoyl-benzamide

Melting point of the hydrochloride 277°–278°, after crystallization from ethanol/water (1:1).

EXAMPLE 8

N-[2-(2,2,6,6-tetramethyl-piperidino)-ethyl]-2,4-dichloro-5-sulphamoyl-benzamide Double melting point of the hydrochloride 139°/245–247°, after crystallization from water.

The following compounds may be produced in a manner analogous to that described in Example 2:

EXAMPLE 9

N-[2-(2,2,6,6-tetramethyl-piperidino)-ethyl]-4-chloro-3-nitro-benzamide

Melting point 261–264°, after crystallization from water.

EXAMPLE 10

N-[2-(2,2,6,6-tetramethyl-piperidino)-ethyl]-3-chloro-benzamide

Melting point of the hydrochloride 243–245°, after crystallization from ethanol.

EXAMPLE 11

N-[2-(2,2,6,6-tetramethyl-piperidino)-ethyl]-4-chloro-benzamide

Melting point of the hydrochloride 220–222°, after crystallization from isopropanol.

EXAMPLE 12

N-[2-(2,2,6,6-tetramethyl-piperidino)-ethyl]-benzamide

Melting point of the hydrochloride 258–259°, after crystallization from methyl-ethyl ketone.

EXAMPLE 13

N-[2-(2,2,6,6-tetramethyl-piperidino)-ethyl]-3,4,5-trimethoxy-benzamide

Melting point of the hydrochloride 245–247° (decomposition), after crystallization from ethanol.

EXAMPLE 14

Example of a medicinal preparation: Tablets

|  | For each tablet, g. | Parts |
|---|---|---|
| N-[2-(2,2,6,6-tetramethyl-piperidino)-ethyl]-4-chloro-3-sulphamoyl-benzamide-hydrogen-malonate (compound of Example 1) | ¹ 0.1260 | 70.00 |
| Magnesium stearate | 0.0010 | 0.56 |
| Stearic acid | 0.0020 | 1.11 |
| Polyvinyl-pyrrolidone | 0.0050 | 2.78 |
| Talcum | 0.0080 | 4.44 |
| Maize starch | 0.010 | 5.56 |
| Lactose | 0.028 | 15.55 |
|  | 0.180 | 100.00 |

¹ Corresponds to 0.10 g. of the free base.

The active compound is mixed with the magnesium stearate, polyvinyl-pyrrolidone, talcum, maize starch and lactose in dry state. The mixture is granulated with an alcoholic solution of stearic acid and water and is pressed into tablets.

100 g. of the tablet mass theoretically yield 555 tablets, each weighing 0.180 g. and containing 100 mg. of the active compound.

What is claimed is:
1. A compound selected from the group consisting of a compound of formula:

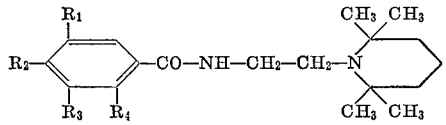

in which
(a) one of the substituents $R_1$, $R_2$ and $R_3$ is hydrogen, a second is hydrogen, fluorine, chlorine, bromine or methyl, the third is hydrogen, sulphamoyl or nitro, or
(b) one of the substituents $R_1$, $R_2$ and $R_3$ is hydrogen and the remaining two are chlorine, or
(c) each of $R_1$, $R_2$ and $R_3$ is methoxy, and $R_4$ is hydrogen or, when $R_1$ is sulphamoyl, $R_2$ is chlorine and $R_3$ is hydrogen, $R_4$ is chlorine,
and physiologically acceptable acid addition salts thereof.

2. N-[2-(2,2,6,6 - tetramethyl - piperidino) - ethyl] - 4-chloro-3-sulphamoyl-benzamide.
3. N-[2-(2,2,6,6-tetramethyl-piperidino)-ethyl] - 3,4-dichlorobenzamide.
4. N-[2-(2,2,6,6-tetramethyl-piperidino)-ethyl] - 4 - sulphamoyl-benzamide.
5. N-[2 - (2,2,6,6 - tetramethyl - piperidino) - ethyl]-4-fluoro-3-sulphamoyl-benzamide.
6. N-[2 - (2,2,6,6 - tetramethyl - piperidino) - ethyl] - 4-methyl-3-sulphamoyl-benzamide.
7. N-[2 - (2,2,6,6 - tetramethyl - piperidino) - ethyl] - 4-bromo-3-sulphamoyl-benzamide.
8. N-[2 - (2,2,6,6 - tetramethyl - piperidino) - ethyl] - 3-sulphamoyl-benzamide.
9. N-[2 - (2,2,6,6 - tetramethyl - piperidino)-ethyl]-2,4-dichloro-5-sulphamoyl-benzamide.
10. N-[2 - (2,2,6,6 - tetramethyl - piperidino) - ethyl]-4-chloro-3-nitro-benzamide.
11. N-[2 - (2,2,6,6 - tetramethyl - piperidino) - ethyl]-3-chloro-benzamide.
12. N-[2 - (2,2,6,6 - tetramethyl - piperidino) - ethyl]-chlorobenzamide.
13. N-[2 - (2,2,6,6 - tetramethyl - piperidino) - ethyl]-benzamide.
14. N-[2 - (2,2,6,6 - tetramethyl - piperidino) - ethyl]-3,4,5-trimethoxy-benzamide.

References Cited

UNITED STATES PATENTS 3,357,978   12/1967   Thominet _____ 260—47.1

JAMES A. PATTEN, Primary Examiner

U.S. Cl. X.R.

260—294, 544; 424—192, 267, 515, 524